United States Patent [19]

Novick

[11] Patent Number: 4,558,445
[45] Date of Patent: Dec. 10, 1985

[54] APPLIQUE RATE CONVERTER

[75] Inventor: Leonard R. Novick, Acton, Mass.

[73] Assignee: The United States of America as represented by the Secretary of the Air Force, Washington, D.C.

[21] Appl. No.: 601,520

[22] Filed: Apr. 18, 1984

[51] Int. Cl.$^4$ ............................................. H04J 3/07
[52] U.S. Cl. ..................................... 370/84; 370/102
[58] Field of Search .................. 370/102, 84, 112, 100

[56] References Cited

U.S. PATENT DOCUMENTS

| | | | |
|---|---|---|---|
| 2,979,565 | 4/1961 | Zarcone | 178/50 |
| 3,564,414 | 2/1971 | Ebert | 370/102 |
| 3,794,773 | 2/1974 | Jacob et al. | 179/15 BS |
| 3,823,401 | 7/1974 | Berg et al. | 343/204 |
| 3,934,093 | 1/1976 | Thyselius | 179/15 BA |
| 3,987,248 | 10/1976 | Platet et al. | 370/102 |
| 4,025,720 | 5/1977 | Pachynski | 370/102 |
| 4,079,371 | 3/1978 | Shimamura | 370/102 |
| 4,258,433 | 3/1981 | Herschtal et al. | 370/24 |
| 4,317,198 | 2/1982 | Johnson | 370/112 |
| 4,333,176 | 6/1982 | Looschen | 370/84 |

*Primary Examiner*—Douglas W. Olms
*Attorney, Agent, or Firm*—Donald J. Singer; Willard R. Matthews

[57] ABSTRACT

The applique rate converter permits a digital multiplexer to support any data rate less than half of its input port design rate. The applique rate converter develops a composite data stream consisting of alternate data bits and data boundary bits. The data boundary bits change state at each new data bit (corresponding to a change in the data clock.) The composite bit stream is increased to the output data rate by means of a circuit called the 'synchronizer'. At the demultiplex side of the applique, the data is separated from the composite stream by a decoding process and, if necessary, the data stream is rate smoothed. The major sections of the applique rate converter are the 'synchronizer' at the multiplex side and the data separator and rate smoothing circuits at the demultiplex side.

6 Claims, 6 Drawing Figures

B = BOUNDARY BIT
D = DATA

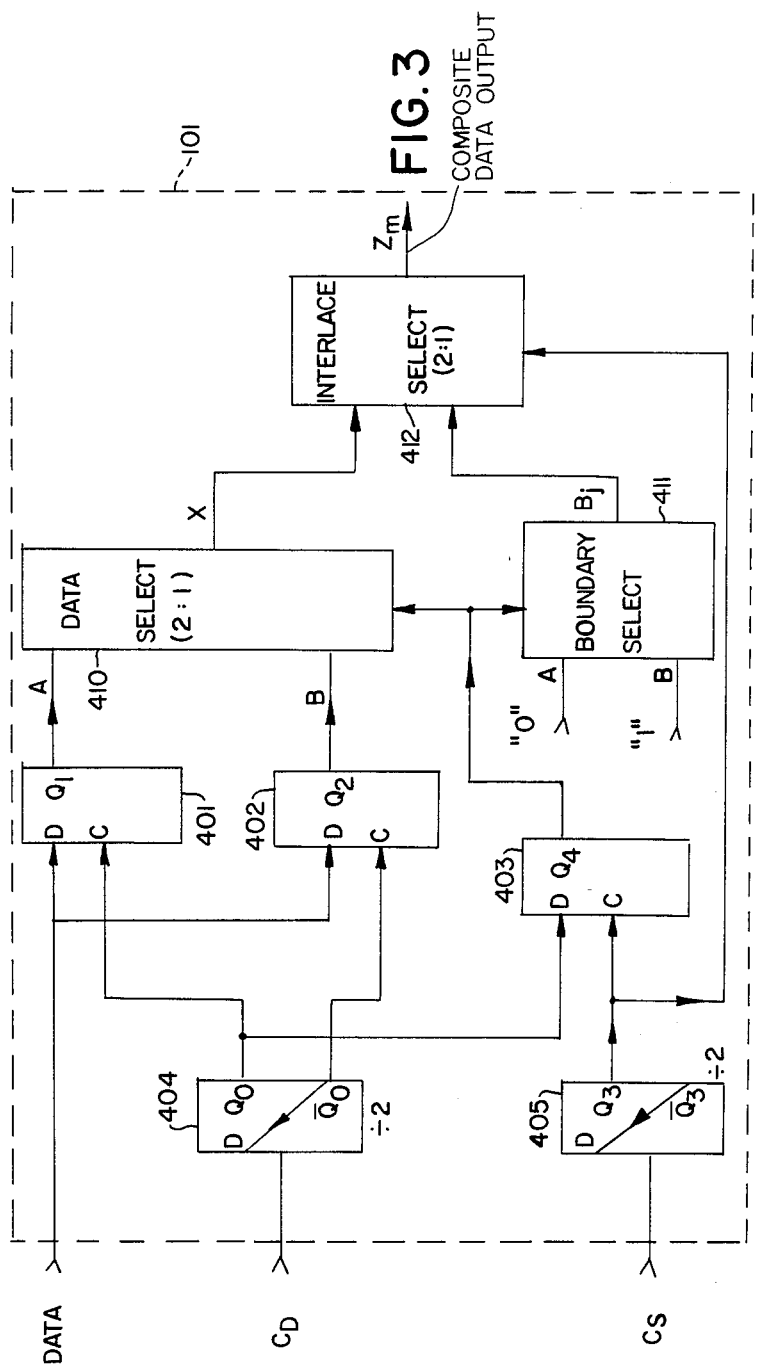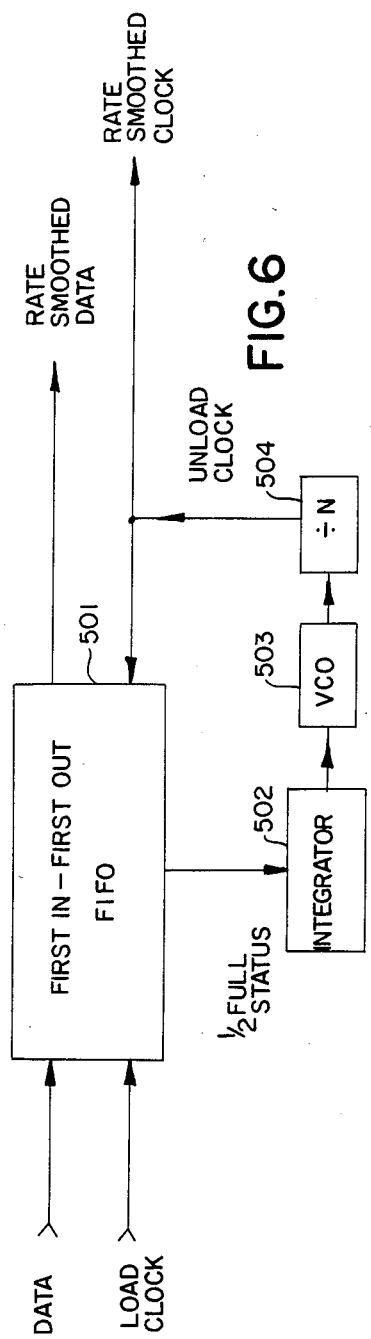

APPLIQUE RATE CONVERTER

STATEMENT OF GOVERNMENT INTEREST

The invention described herein may be manufactured and used by or for the Government for governmental purposes without the payment of any royalty thereon.

BACKGROUND OF THE INVENTION

The present invention relates to digital data communications systems and specifically to a rate converting technique that permits a digital multiplexer to support any data rate that is less than half of its design rate.

The need for the present invention may arise in a limitless number of ways. For instance, a transmission facility or data port that is designed to carry traffic at a particular data rate may require an exchange with a system operating at another data rate. This task has been alleviated to some extent by the prior art techniques disclosed in the following patents:

U.S. Pat. No. 4,258,433 issued to Hershtal et al on 24 March 1981 and U.S. Pat. No. 2,979,565 issued to Zarcone on 11 April 1961.

The Hershtal patent discloses a digital data communication network having differing data transmission rate capabilities for interconnecting terminal devices when either the terminal devices operate at different data rates, or they are to be interconnected over data links in the network which normally operate at different data rates.

The Zarcone patent discloses a multiplexing synchronizer at the receiving end of a multiplex transmission line which employs the codes transmitted thereover to keep the receiving apparatus in condition to receive the codes both in proper order and in proper timing with each code.

While the prior art devices do allow the successful exchange of data between digital data devices operating at separate data rates, the prior art systems are constrained by data rates that are multiples of each other to avoid errors.

In view of the foregoing discussion, it is apparent that there currently exists the need for a rate converting technique that provides an interface capability between systems possessing data rates that are non-multiple of each other. The present invention is directed toward satisfying that need.

SUMMARY OF THE INVENTION

The present invention provides a rate converting technique that permits a digital multiplexer or transmission system to support any data rate less than half of its design rate. The applique rate converter develops a composite data stream consisting of alternate data bits and data boundary bits. The data boundary bits change state at each new data bit (corresponding to a change in the data clock.) The composite bit stream is then increased to the output data rate by means of a circuit called the 'synchronizer'. At the demultiplex side of the applique, the data is separated from the composite stream by a decoding process and, if necessary, the data stream is rate smoothed. The major sections of the applique rate converter are the 'synchronizer' at the multiplex side and the data separator and rate smoothing circuits at the demultiplex side.

It is a principal object of this invention to provide an improved method and apparatus for interfacing digital data devices operating at different data rates.

It is another object of the invention to permit a digital multiplexer or transmission system to support a digital data system operating at any data rate less than one half of that of the multiplexer or transmission system.

These together with other objects features and advantages of the invention will become more readily apparent from the following detailed description when taken in conjunction with the accompanying drawings wherein like elements are given like reference numerals throughout.

DESCRIPTION OF THE DRAWINGS

FIG. 3 is an illustration of the synchronizer;

FIG. 6 is an illustration of the rate smoothing circuit.

DETAILED DESCRIPTION OF THE PREFERRED EMBODIMENT

The present invention includes a rate converting technique and apparatus that permits a digital multiplexer to support any digital data system having any data rate that is less than one half of the input port rate of the multiplexer.

Figure 1:
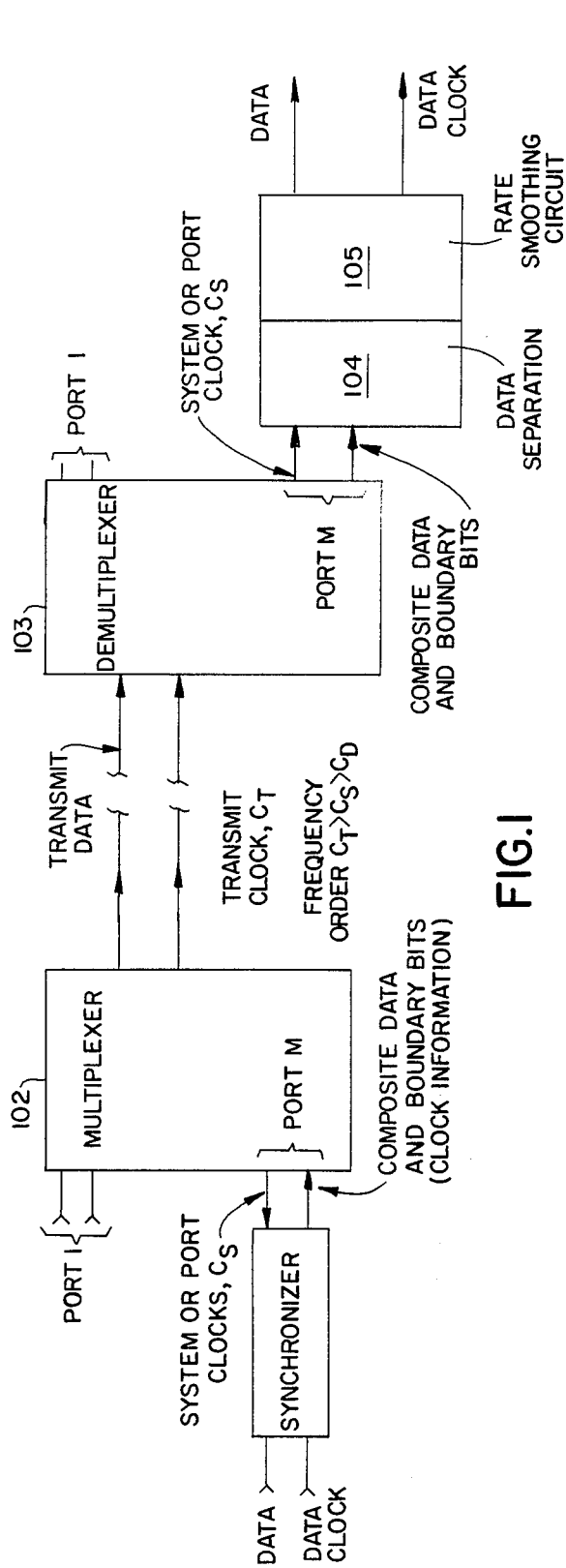
FIG. 1 is a block diagram illustrating the use of one embodiment of the invention.

The applique rate converter develops a composite data stream consisting of alternate data bits and data boundary bits. The data boundary bits change state at each new data bit (corresponding to a change in the data clock.) The composite bit stream is then increased to the output data rate by means of a circuit called the 'synchronizer'. At the demultiplex side of the applique, the data is separated from the composite stream by a decoding process and, if necessary, the data stream is rate smoothed. The major sections of the applique rate converter are the 'synchronizer' at the multiplex side and the data separator and rate smoothing circuits at the demultiplex side. FIG. 1 is a block diagram illustrating the use of one embodiment of the invention and the associated clock and data signals required for operation. The data is shown being transmitted from left to right for the purposes of illustration.

The synchronizer 101 receives the data stream and data clock signal ($C_D$) from a digital data source and the system clock signal ($C_S$) from the multiplexer 102.

Figure 2:
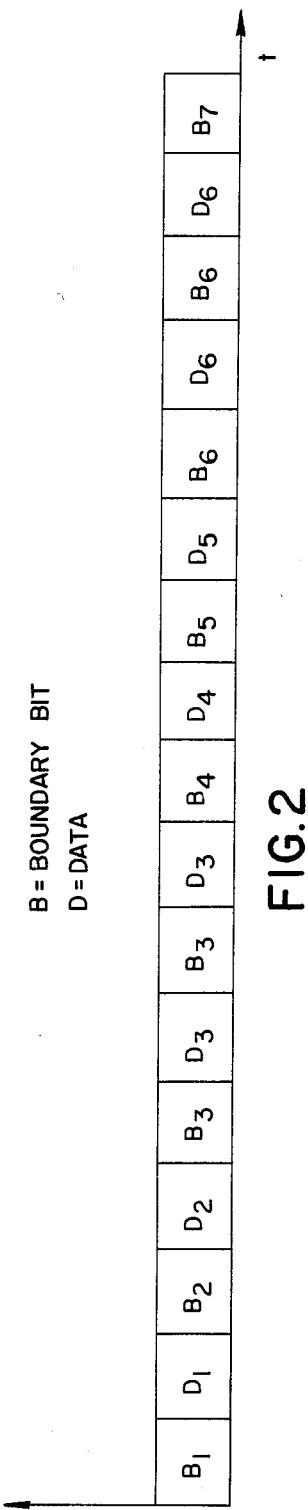
FIG. 2 is an illustration of the composite data signal.

The synchronizer 101 develops a composite data stream consisting of alternate data bits ($D_j$) and data boundary ($B_j$) bits. The data boundary bits change state at each new data bit (corresponding to a change in the data clock). FIG. 2 is an illustration of the composite data stream generated by the invention. It is the technique of alternating the data bits ($D_j$) with the boundary bits ($B_j$) that permits the digital multiplexer to support any digital data system having any data rate that is less than one half the rate of the multiplexer.

Returning to FIG. 1, the clock frequency, $C_{Sf}$, of the existing multiplexer port or transmission system must be at least twice as fast as the data source clock frequency, $C_{Df}$. This assures that there are enough time slots to accommodate both data and data boundary bits. There will be, in general, redundant data and data boundary bits in the composite bit stream. The boundary for each bit is defined by the $C_S$ edge. FIG. 2 shows that $D_3$ and $B_3$ are repeated. If the multiplexer port clock frequency $C_S$ was much greater than that of the data clock frequency, $C_{Df}$ then repeats would be more frequent and, in fact, long strings of repeated symbols would occur. Since the data clock and the system clock are asynchronous, there is no prior way of knowing when repeated symbols will occur. The synchronizer 101 sends the composite data and boundary bit stream at the output data rate of $C_{Sf}$ to the multiplexer 102 where it is transmitted to the demultiplexer 103. At the demultiplexer side of the applique, the data is separated from the composite stream by the data separator 104 and, if necessary, the data stream is rate smoothed.

Statistically, the data bits have fewer changes in state than the interleaved data boundary bits. (The data boundary bits are guaranteed to change state for each data clock but the data bits may or may not change state). The applique uses this information to separate the data from the data boundary symbols. It also uses the data boundary symbols to regenerate the data clock at the demultiplexer.

The advantages of the present invention over the prior art is that the high speed data rate $C_{Sf}$ of the multiplexer port need not be a multiple or synchronous with the data rate, $C_{Df}$, of the digital data source due to the design of the synchronizer 101.

There are potential pitfalls in generating the composite data stream due to the fact that $C_D$ and $C_S$ are asynchronous.

Since the input data rate is less than the system clock rate, a First-In-First-Out (FIFO) buffer cannot be used without pulse stuffing. The average input and output data rate of the FIFO must be equal to prevent data underflow or overflow.

Figure 4:
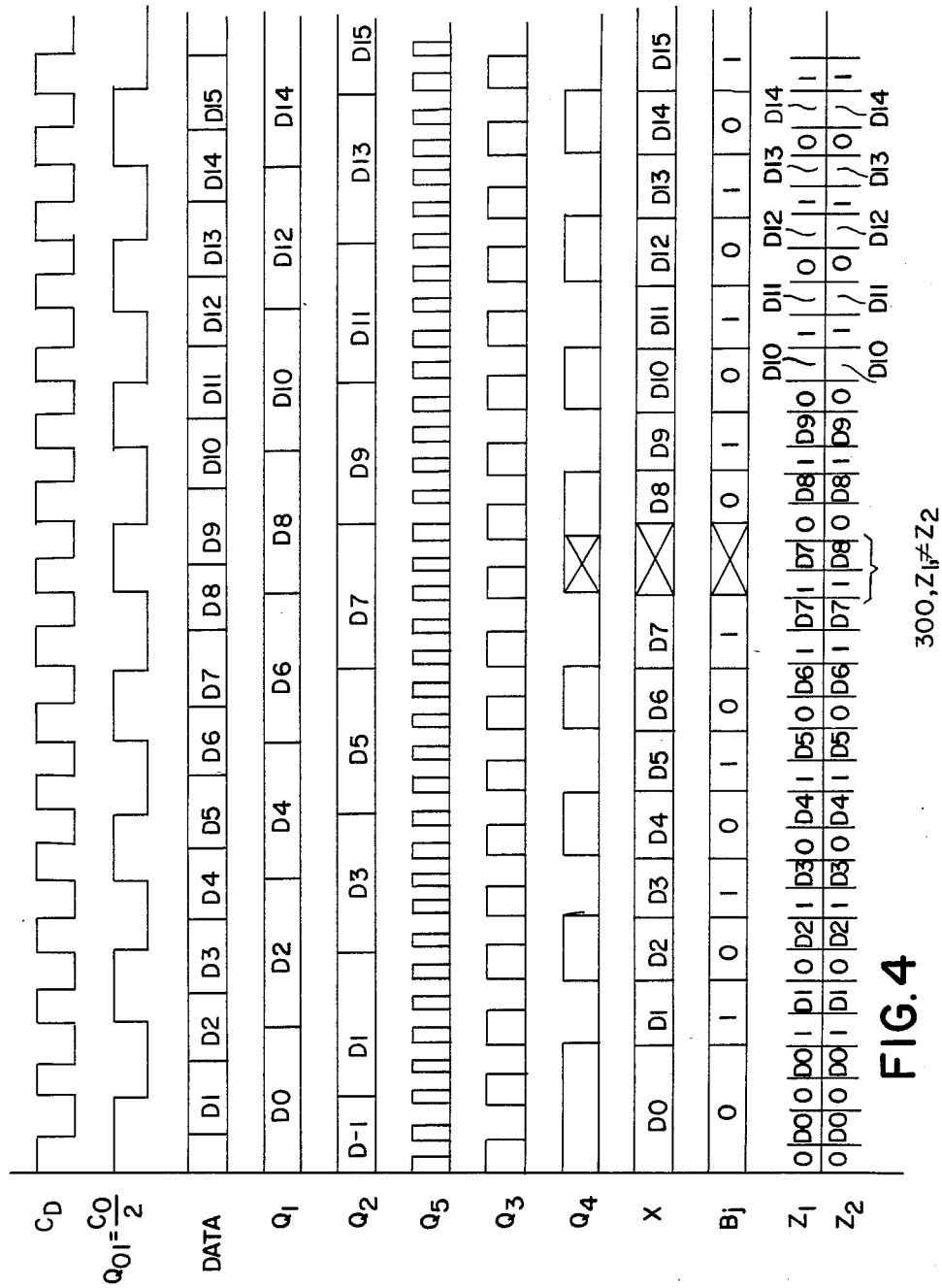
FIG. 4 is an illustration of the waveforms of the synchronizer.

The purpose of the synchronizer 101 is to eliminate the hazards of strobing the data during a data edge when it is changing. FIG. 3 is an illustration of the synchronizer and FIG. 4 depicts its waveforms. The schronizer 101 produces the composite data output (Zn). An example of one embodiment of the synchronizer is made with five D-type registers 401–405 and three select chips 410–412.

The incoming data is strobed into two data registers 401 and 402 or alternate clock times ($C_D$). Incoming data is stored in each of the two D-type registers 401 and 402 such that each data bit ($Q_1$ and $Q_2$) is stored for two clock cycles, then the two stored data inputs A and B are sent to the data select chip 410.

The data clock signal $C_D$ is received by clock register 404 which divides the clock frequency $C_{Df}$ by two producing $Q_o$ and $\overline{Q}_o$ which are sent to provide the timing for data registers 401 and 402.

The system clock signal $C_S$ is received by clock register 405 which produces the strobing signal $Q_3$ (the frequency of $Q_3$ is one half that of $C_{Sf}$) which is sent to data register 403 and the interlace select chip 412.

Data register 403 is a D-type register producing the select control signal $Q_4$ by strobing $Q_o$ using $Q_3$ as the clock. The select control signal $Q_4$ is sent to the data select chip 410 and the boundary select chip 411. Notice that there can be an ambiguity in $Q_4$ itself, i.e., assume $Q_o$ is changing at the time it is being clocked into the D register by $Q_3$ (see FIG. 4). This ambiguity, however, does not produce a problem at the data select chip 410, for regardless of which input is selected, the data cannot change for a data clock period and the data clock period, $T_D$, is, by definition, longer than $2T_S$ where $T_S$ is the system clock period. If, on the other hand, the data is changing in one of the D-edge registers at the time of a positive going edge of $Q_3$ which controls the select line, the data select chip 410 will always select the input that is not changing. Data will of necessity be clocked out twice at times ($D_0$, $D_7$ or $D_8$) but only data changes will be accompanied by changes in the boundary bits as shown in the Z waveforms.

The data select chip 410 produces the data bits (X) which will be used in the composite data stream output ($Z_n$). The boundary bits are selected by the boundary select chip 411 from inputs A and B tied to a logic '0' and '1' respectively.

The interlace select chip 412 produces the composite data stream output ($Z_n$) by alternating the data bits (X) produced by the data select chip 410, with the data boundary bits $B_j$ produced by the boundary select chip 411. Two possible composite data streams are shown as $Z_1$, and $Z_2$ in FIG. 4. Each of these data streams would be decoded correctly by the data separator.

Figure 5:
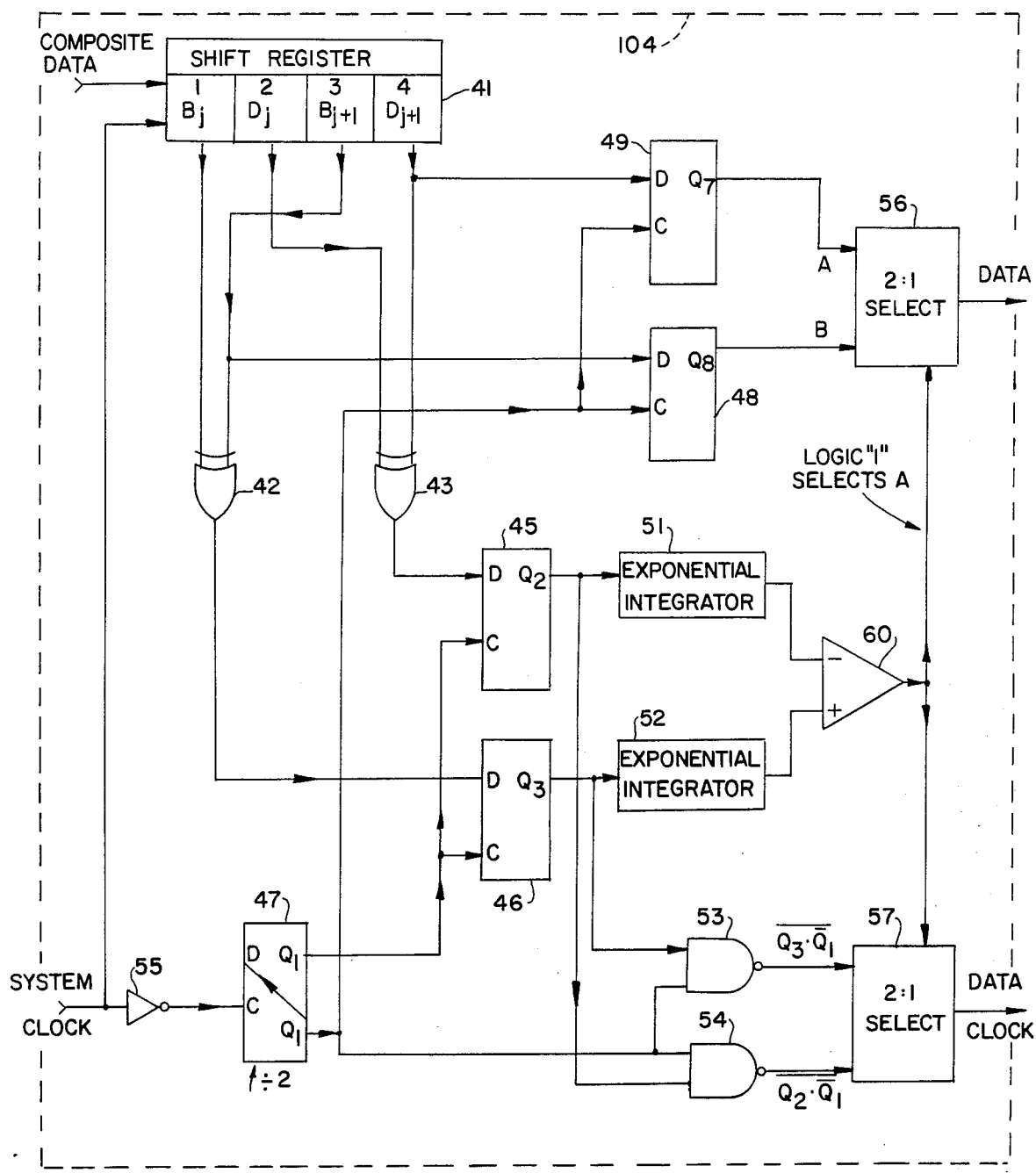
FIG. 5 is an illustration of the data separator.

FIG. 5 is an illustration of the data separator 104 which receives the composite data stream output and clock signal $C_S$ from the demultiplexer 103 and generates an output of the data signal and data clock signal at the desired initial data rates. The data separator contains a shift register 41, two exclusive or (XOR) gates 42 and 43, D-edge registers 45–49, an inverter 55 two NAND gates 53, 54, a comparator circuit 60 and two select chips 56 and 57.

The shift register 41 receives the composite data stream output and system clock signal $C_S$ from the demultiplexer (103 of FIG. 1). The shift register separates the composite data stream into four signals: two boundary bits ($B_j$ and $B_{j+1}$) and two data bits ($D_j$ and $D_{j+1}$). For the purpose of illustration, the output signals of the shift register were designated "boundary bits" and "data bits", but the shift register actually is capable of just breaking up the composite data stream into separate bits and does not successfully identify the data bits. This determination is actually made by the data select chip 56 which receives the control logic signal from the comparator circuit 60 to select the data bits from the output signals of data registers 48 and 49. The shift register illustrates a "snap shot" of the composite data stream at one clock interval. The outputs of register one and three drive the XOR gate 42 with the resultant signal sent to data register 46 where it is strobed by the signal $Q_1$. Register outputs two and four drive the XOR gate 43 with the resultant signal sent to data register 45 where it is strobed by the signal $Q_1$. Register outputs two and four drive the XOR gate 43 with the resultant signal sent to data register 45 where it is strobed by the signal $\overline{Q}_1$.

The system clock signal $C_S$ is received from the demultiplexer and inverted by an inverter 55. The inverted $C_S$ is sent to the divide by 2 counter 47 to generate $Q_1$ and $\overline{Q}_1$. Signal $Q_1$ is sent to data registers 45 and 46 and $\overline{Q}_1$ is sent to data register 48 and 49 and also to NAND gates 53 and 54.

The strobed output signals ($Q_2$ and $Q_3$) of registers 45 and 46 are then integrated by two exponential integrators and the two integrated outputs are sent to the comparator circuit 60. At the comparator circuit, the highest integrated output is assumed to correspond to the boundary bits. This decision is manifested by treating the output signal of the comparator circuit 60 as a control logic signal which is sent to control the two select chips 56 and 57.

The output of the first select chip (or data select chip) 56 is the data output. This data output signal is produced as follows: The data select chip 56 receives three inputs, one of which is the control logic signal from the comparator circuit 60 which allows the first select chip to select the data for output from the other two inputs.

The second input into the data select chip is the strobed data bit ($Q_7$) signal. This signal is produced when the data bit $D_{j+1}$ from the shift register 41 is input into data register 49 where it is strobed by the signal $\overline{Q}_1$ from the divide by 2 circuit 47.

The third input into the data select chip is the strobed boundary bit signal $Q_8$. This signal is produced when the boundary bit $B_{j+1}$ from the shift register 41 is input into data register 48 where it is strobed by the signal $\overline{Q}_1$ from the divide by 2 circuit 47.

The control logic signal from the comparator circuit 60 is also used by the clock select chip 57 to successfully select the data clock signal from two inputs. The first input into the clock select chip is the output of NAND gate 53.

The second input into the clock select chip 57 is the output of NAND gate 54.

FIG. 6 is an illustration of the rate smoothing circuit which smooths the output data stream and clock signal from the data separator 104. The data is rate smoothed using a FIFO 501, integrator 502 voltage controlled oscillator (VCO) 503 and divider circuit 504. The use of a non crystal controlled VCO and divider circuits permits a very large dynamic frequency range.

The above rate converting technique and apparatus permits a digital multiplexer to support any digital data system having any data rate that is less than one half of the rate of the multiplexer.

While the invention has been described in a single embodiment, it is understood that the words which have been used are words of description rather than words of limitation and that changes within the purview of the appended claims may be made without departing from the scope and spirit of the invention in its broader aspects.

What is claimed is:

1. In combination with a first and second digital data system, a multiplexer and demultiplexer, a rate converting system permitting said multiplexer and said demultiplexer to support said first and second digital data systems, said first and second digital data systems having less than one half the data rate of said multiplexer, said rate converting system comprising:

a data selection means receiving a digital data signal and a data clock signal from said first digital data system, said data clock signal indicating the data rate of said first digital data system, said data selection means producing a data bit signal;

a boundary selection means receiving a system clock signal from said multiplexer, said system clock signal indicating the input data rate of said multiplexer, said boundary selection means producing a data boundary bit signal;

an interface select chip receiving said data bit signal from said data selection means and alternating it with said data boundary bit signal from said boundary selection means to produce and send a composite data and clock signal to said multiplexer, said composite data and clock signal having the input port data rate of said multiplexer, said interface select chip sending said composite data and clock signal to said multiplexer for transmittal to said demultiplexer;

a data separator means receiving said composite data and clock signal from said demultiplexer, said data separator means separating said composite data and clock signal into said digital data signal and said data clock signal; and a rate smoothing means receiving and smoothing said digital data signal and said data clock signal from said data separator means, said rate smoothing means sending said digital data signal and said data clock signal to said second digital data system.

2. A rate converting system as defined in claim 1 wherein said data selection means comprises:

a first clock register receiving said data clock signal from said first digital data system, said first clock register dividing said data clock signal into a first and second strobing signal;

first and second data registers each receiving said digital data signal from said first digital data system, said first data register receiving and using said first strobing signal from said first clock register in conjunction with said digital data signal to produce a first strobed data signal;

said second data register receiving and using said second strobing signal from said first clock register in conjunction with said digital data signal to produce a second strobed data signal;

and a data select chip receiving said first strobed data signal from said first data register and said second strobed data signal from said second data register, and a first select control signal from said boundary selection means, said first select control signal determining the selection between said first and second strobed data signal to be used by said data select chip to produce said data bit signal.

3. A rate converting system as defined in claim 2 wherein said boundary selection means comprises:

second and third clock register, said second clock register receiving a system clock signal from said multiplexer, said system clock signal indicating the data rate of said multiplexer port, said second clock register dividing said system clock signal into third strobing signal;

said third clock register receiving said third strobing signal from said second clock register and said first strobing signal from said first clock register and producing said first select control signal by strobing said first strobing signal with said second strobing signal; and a boundary select chip receiving said first select control signal from said third clock register, said boundary select chip producing said data boundary bit signal, said data boundary bit signal containing a progression of bit signals alternating between logic "0" and logic "1".

4. A rate converting system as defined in claim 3 wherein said data separator means comprises:

a shift register receiving said composite data and clock signal and said system clock signal from said demultiplexer port and producing an output containing first, second, third and fourth bits.

first and second exclusive OR gates, said first exclusive OR gate receiving as inputs said first and third bits produced by said shift register, said first exclusive OR gate producing a first resultant signal;

said second exclusive OR gate receiving as inputs said second and fourth bits produced by said shift register, said second exclusive OR gate producing a second resultant signal;

an inverter circuit receiving said system clock signal from said demultiplexer and producing an inverted system clock signal;

a fourth clock register receiving said inverted system clock signal from said inverter circuit and dividing it into a fourth and fifth strobing signal;

a third data register receiving as inputs the second resultant signal from said second exclusive OR gate and said fourth strobing signal from said fourth clock register and producing a first strobed bit signal by strobing the second resultant signal with said fourth strobing signal;

a fourth data register receiving as inputs the first resultant signal from said first exclusive OR gate and said fourth strobing signal from said fourth clock register and producing a second strobed bit signal by strobing the first resultant signal with said fourth strobing signal;

a first and second integrator circuit, said first integrator circuit receiving and integrating said strobed data bit signal producing a first integrated first strobed data bit signal;

said second integrator receiving and integrating said second strobed bit signal from said fourth data register and producing a second integrated strobed bit signal;

a comparator circuit producing a second select control signal by comparing said first and second integrated strobed bit signals by treating each highest integrated output as a boundary bit portion of said composite data and clock signal;

a data select means receiving said fourth bit and said third bit from said shift register and said second select control signal from said comparator circuit and producing an output digital data signal to said second digital data system; and a data clock select means receiving said first strobed bit signal from said third data register NANDED with said fifth strobing signal, said data clock select means receiving said second strobed bit signal from said fourth data register NANDED with said fifth strobing signal, said data clock select means receiving said select control signal from said comparator circuit, said data clock select means producing an output data clock to said second digital data system with said output data clock having the average data rate of said first digital data system.

5. A rate converting system as defined in claim 4 wherein said data select means comprises:

fifth and sixth data registers, said fifth data register receiving said fourth bit from said shift register and strobing it with said fifth strobing signal from said fourth clock register to produce a first output data bit;

said sixth data register receiving said third bit from said shift register and strobing it with said fifth strobing signal from said fourth clock register to produce a second outout data bit; and a data select chip receiving said first and second output data bits from said fifth and sixth data registers, said data select chip receiving and using said second select control signal from said comparator circuit as a selection control between said first and second output data bits to produce said output digital data signal to said second digital data system.

6. A rate converting system as defined in claim 5 wherein said data clock select means comprises:

first and second NAND gates each receiving as an input said fifth strobing signal from said fourth clock register, said first and gate receiving said second strobed bit signal from said fourth data register and producing the first NAND gate output;

said second NAND gate receiving said first strobed data bit signal from said third data register and producing the second NAND gate output; and a data clock select chip receiving said first and second NAND gate outputs from said first and second NAND gates, said data clock select chip receiving and using said second select control signal from said comparator circuit as a selection signal between said first and second NAND gate outputs to produce said output data clock to said second digital data system.

* * * * *